(«12») United States Patent
Wade et al.

(10) Patent No.: US 12,535,026 B2
(45) Date of Patent: *Jan. 27, 2026

(54) METHODS AND SYSTEMS FOR AN EXHAUST SYSTEM

(71) Applicant: Ford Global Technologies, LLC, Dearborn, MI (US)

(72) Inventors: Robert A. Wade, Plymouth, MI (US); Adam Matthew Selthofer, Brighton, MI (US); Gianluca Mantovano, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,377

(22) Filed: May 23, 2024

(65) Prior Publication Data

US 2025/0361827 A1 Nov. 27, 2025

(51) Int. Cl.
  *F01N 3/28* (2006.01)
  *F01N 5/02* (2006.01)
  *F01N 9/00* (2006.01)

(52) U.S. Cl.
  CPC ............ *F01N 3/2892* (2013.01); *F01N 5/02* (2013.01); *F01N 9/00* (2013.01); *F01N 2900/10* (2013.01); *F01N 2900/1404* (2013.01)

(58) Field of Classification Search
  CPC . F01N 3/2892; F01N 5/02; F01N 9/00; F01N 2900/10; F01N 2900/1404
  See application file for complete search history.

(56) References Cited

U.S. PATENT DOCUMENTS

| 5,119,631 A * | 6/1992 | Kayanuma ................ F01N 3/22 60/276 |
| 9,016,047 B2 | 4/2015 | Gonze et al. |
| 10,344,690 B2 * | 7/2019 | Bramson ................ F02M 26/35 |
| 2006/0201468 A1 * | 9/2006 | Lancaster ............. F02D 9/1055 123/179.5 |
| 2010/0281866 A1 * | 11/2010 | Reynolds ............. F01N 13/009 60/686 |
| 2012/0017575 A1 * | 1/2012 | Sloss ........................ F28F 27/02 60/320 |
| 2016/0290205 A1 * | 10/2016 | Hebert ................... F01M 5/001 |
| 2018/0156142 A1 * | 6/2018 | Uhrich ................... F02D 41/26 |
| 2020/0018214 A1 * | 1/2020 | Han ......................... F01N 9/00 |
| 2023/0407776 A1 * | 12/2023 | Furui .................... F01N 11/007 |

FOREIGN PATENT DOCUMENTS

WO    2015086905 A1    6/2015

OTHER PUBLICATIONS

Mantovano, G. et al., "Methods and Systems for an Exhaust System," U.S. Appl. No. 18/672,396, filed May 23, 2024, 35 pages.

* cited by examiner

*Primary Examiner* — Brandon D Lee
(74) *Attorney, Agent, or Firm* — Vincent Mastrogiacomo; McCoy Russell LLP

(57) ABSTRACT

Methods and systems are provided for an exhaust gas heat recovery (EGHR) device. In one example, a system includes an exhaust gas heat recovery (EGHR) device with a bypass passage arranged upstream of a catalyst. A bypass valve is configured to control exhaust flow into the bypass passage based on one or more of an exhaust temperature, an engine load, and a cabin heating request.

15 Claims, 6 Drawing Sheets

METHODS AND SYSTEMS FOR AN EXHAUST SYSTEM

FIELD

The present description relates generally to methods and systems for an exhaust system including an exhaust gas heat recovery (EGHR) device.

BACKGROUND/SUMMARY

Vehicle operating parameters and vehicle configurations are continuously modified to decrease emissions while meeting driver demand. One example limitation is temperature, wherein engine operating parameters are limited to reduce exhaust temperatures to reduce degradation to exhaust system materials.

Some previous examples include using exotic materials that are more resistant to higher engine temperatures. However, these materials are more expensive and less available, which may lead to increased manufacturing complexity and delays. Other examples used to reduce modifying engine operating points may include enhancing engine cooling. These systems may also face drawbacks related to increased manufacturing complexity, increased packaging sizes, and engine and/or engine cooling system reconfigurations. Additionally, larger cooling systems may extend a cold-start duration. As such, there is a demand for alternatives to systems and methods that currently exist.

In one example, the issues described above may be addressed by a system including an exhaust gas heat recovery (EGHR) device with a bypass arranged upstream of a catalyst. In this way, the EGHR may cool the exhaust gas during operating conditions where exhaust temperatures are increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
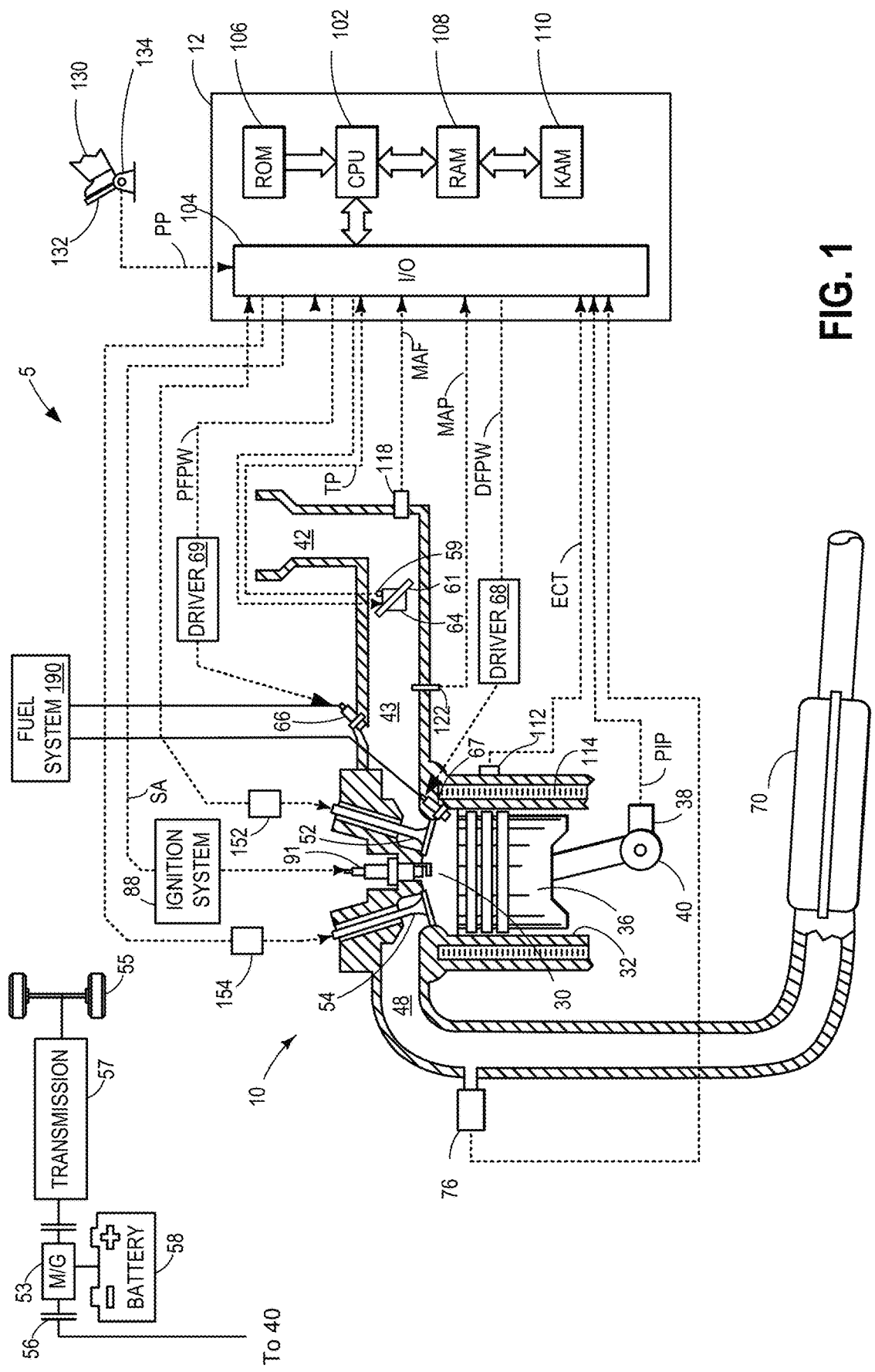
FIG. 1 illustrates a schematic of an engine included in a hybrid vehicle.
Figure 2:
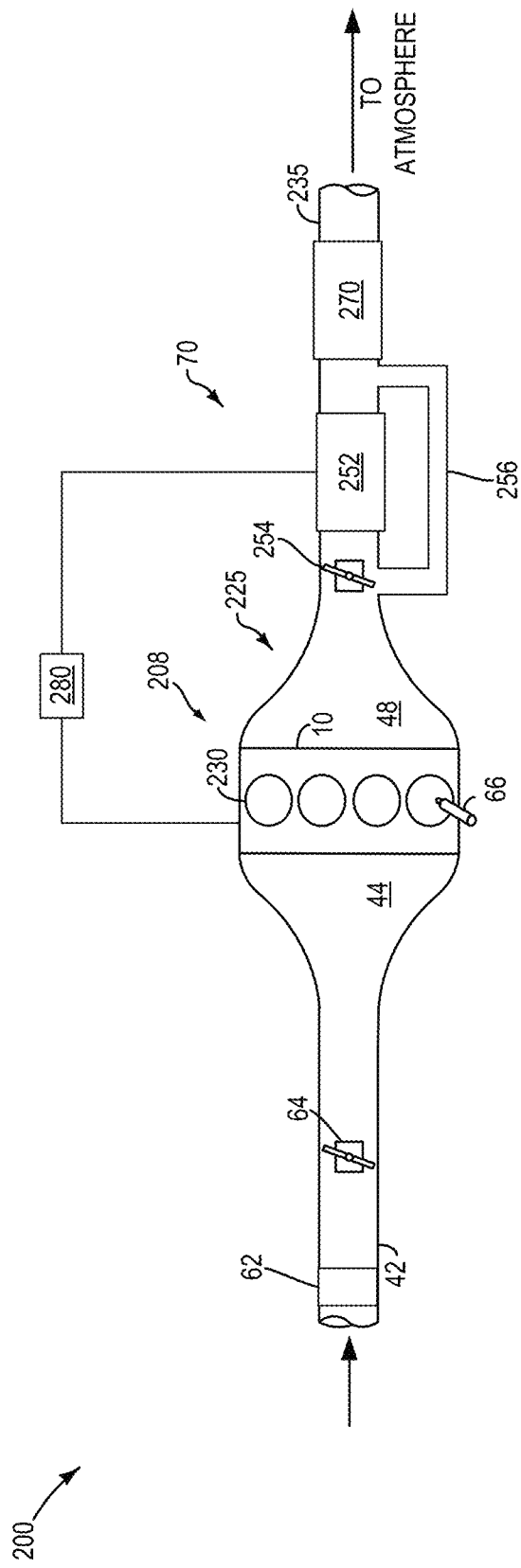
FIG. 2 illustrates an example of an engine system including an exhaust gas heat recovery (EGHR) device.
Figure 3:
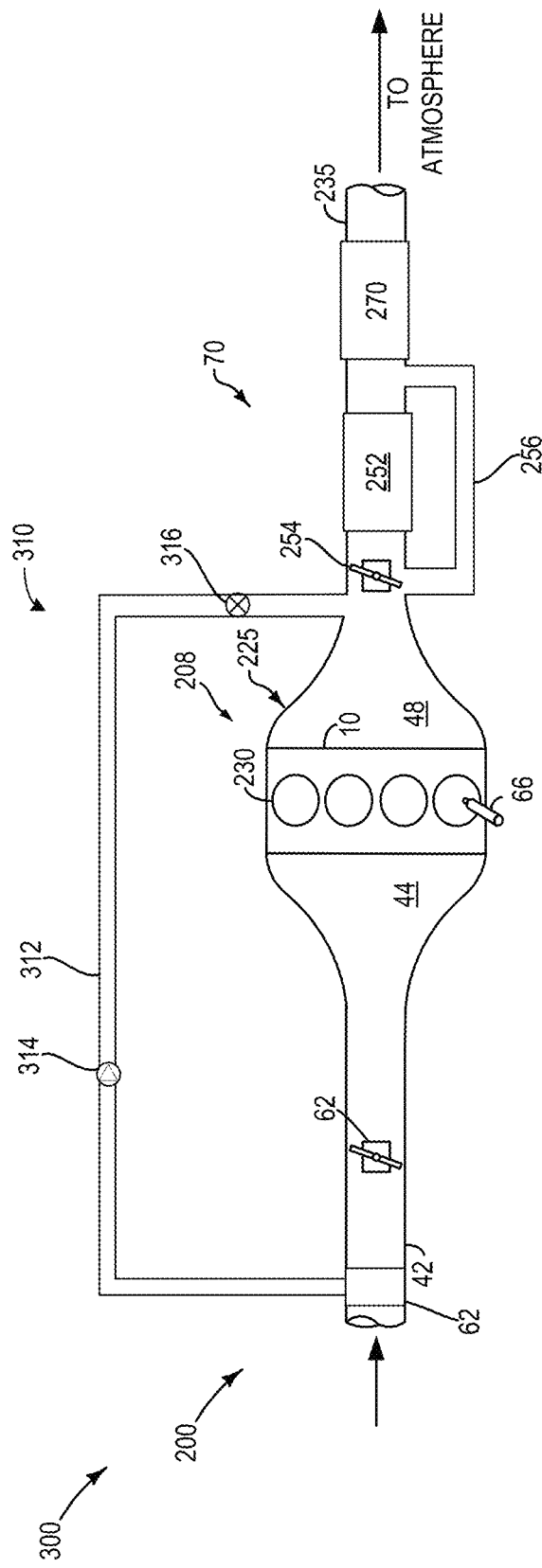
FIG. 3 illustrates an example of an engine system include the EGHR device and an air delivery system.
Figure 4:
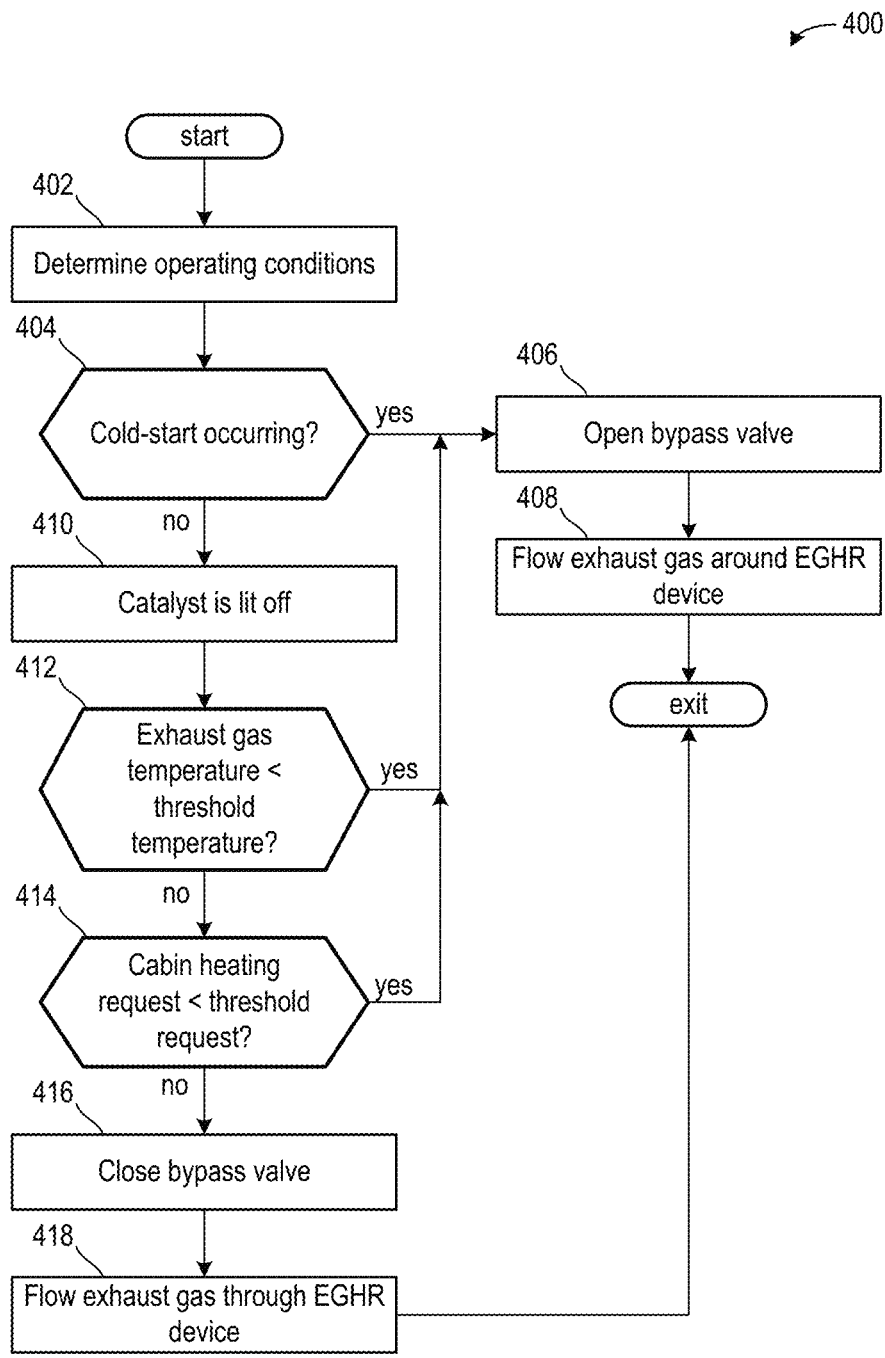
FIG. 4 illustrates a method for operating a bypass valve of the EGHR device.
Figure 5:
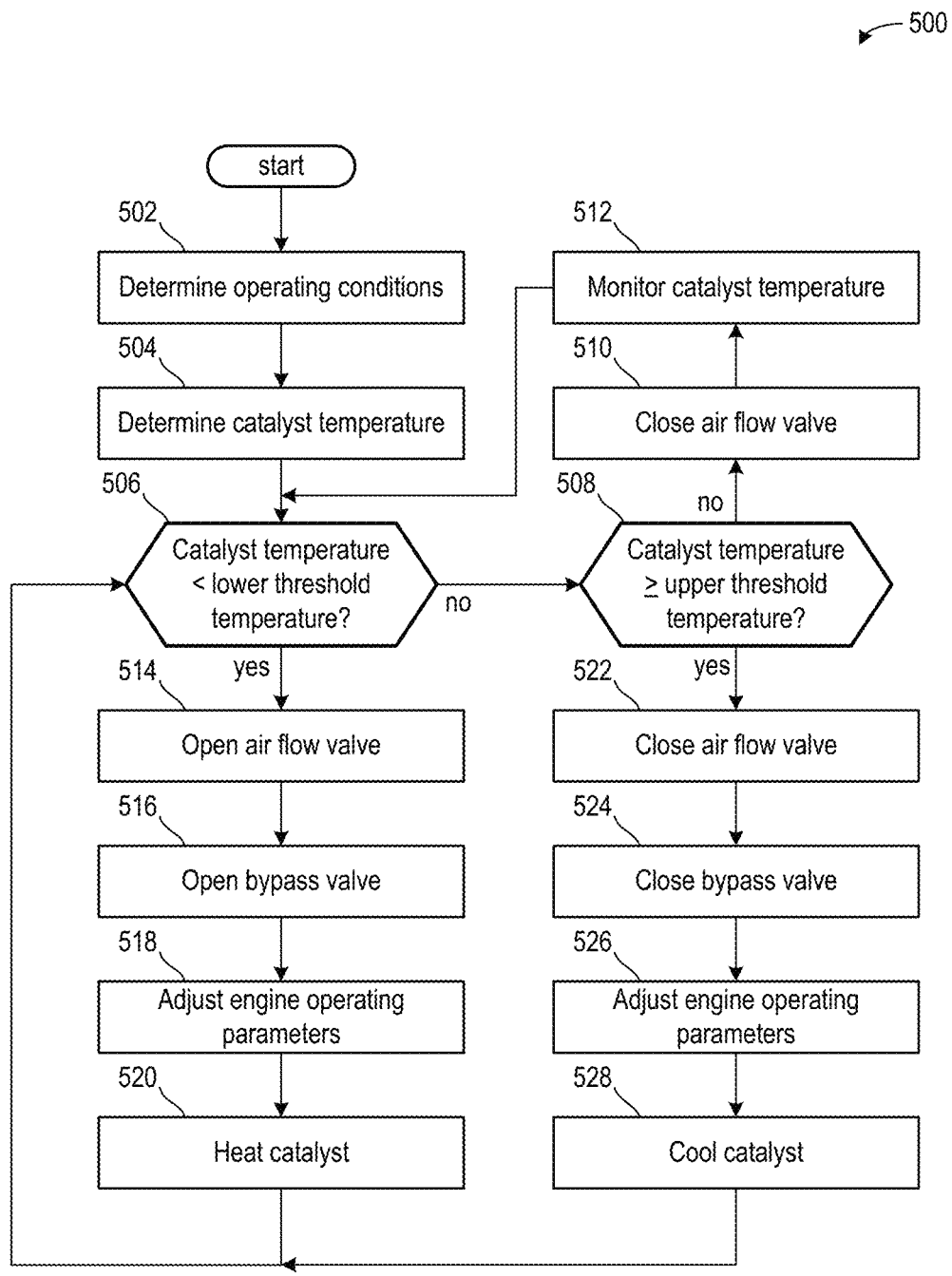
FIG. 5 illustrates a method for operating the air delivery system and the bypass valve.
Figure 6:
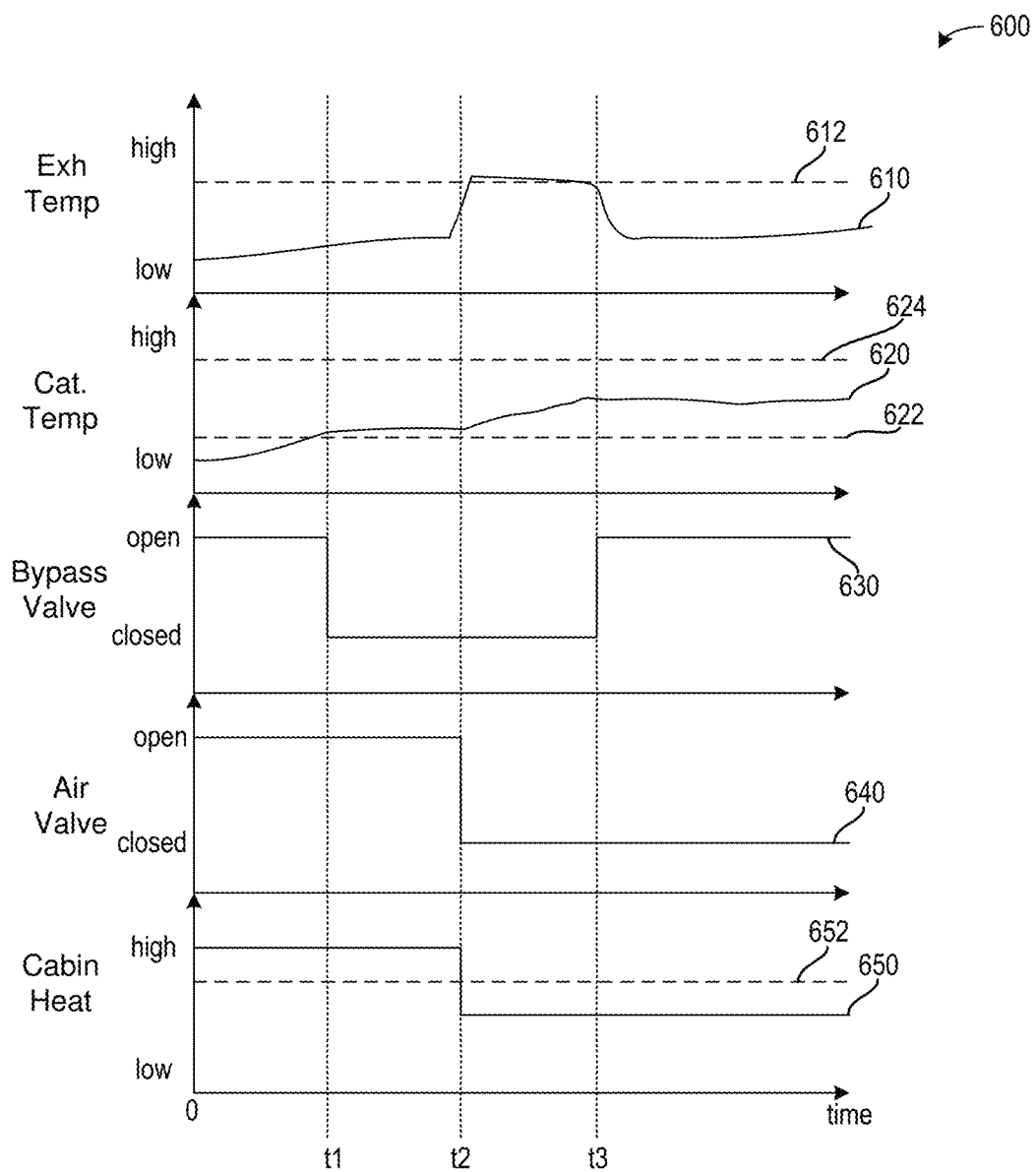
FIG. 6 graphically illustrates an operating sequence of the engine system including the EGHR device and the air delivery system.

The following description relates to systems and methods for an engine system. FIG. 1 illustrates a schematic of an engine included in a hybrid vehicle. FIG. 2 illustrates an example of an engine system including an exhaust gas heat recovery (EGHR) device. FIG. 3 illustrates an example of an engine system include the EGHR device and an air delivery system. FIG. 4 illustrates a method for operating a bypass valve of the EGHR device. FIG. 5 illustrates a method for operating the air delivery system and the bypass valve. FIG. 6 graphically illustrates an operating sequence of the engine system including the EGHR device and the air delivery system.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a spark ignition internal combustion engine 10. Engine 10 may be included in a vehicle 5. Engine 10 comprises a plurality of cylinders of which one cylinder 30 (also known as combustion chamber 30) is shown in FIG. 1. Cylinder 30 of engine 10 is shown including combustion chamber walls 32 with piston 36 positioned therein and connected to crankshaft 40. A starter motor (not shown) may be coupled to crankshaft 40 via a flywheel (not shown), or alternatively, direct engine starting may be used.

Combustion chamber 30 is shown communicating with intake manifold 43 and exhaust manifold 48 via intake valve 52 and exhaust valve 54, respectively. In addition, intake manifold 43 is shown with throttle 64 which adjusts a position of throttle plate 61 to control airflow from intake passage 42.

Intake valve 52 may be operated by controller 12 via actuator 152. Similarly, exhaust valve 54 may be activated by controller 12 via actuator 154. During some conditions, controller 12 may vary the signals provided to actuators 152 and 154 to control the opening and closing of the respective intake and exhaust valves. The position of intake valve 52 and exhaust valve 54 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In another embodiment, four valves per cylinder may be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

In some embodiments, each cylinder of engine 10 may be configured with one or more fuel injectors for providing fuel thereto. As shown in FIG. 1, cylinder 30 includes two fuel injectors, 66 and 67. Fuel injector 67 is shown directly coupled to combustion chamber 30 and positioned to directly inject therein in proportion to the pulse width of signal DFPW received from controller 12 via electronic driver 68. In this manner, direct fuel injector 67 provides what is known as direct injection (hereafter referred to as "DI") of fuel into combustion chamber 30. While FIG. 1 shows injector 67 as a side injector, it may also be located overhead of the piston, such as near the position of spark plug 91. Such a position may affect mixing and combustion due to the lower volatility of some alcohol based fuels. Alternatively, the injector may be located overhead and near the intake valve to increase mixing. In some embodiments, the engine 10 may include only one of the port fuel injector 66 or the direct fuel injector 67.

Fuel injector 66 is shown arranged in intake manifold 43 in a configuration that provides what is known as port injection of fuel (hereafter referred to as "PFI") into the intake port upstream of cylinder 30 rather than directly into cylinder 30. Port fuel injector 66 delivers injected fuel in proportion to the pulse width of signal PFPW received from controller 12 via electronic driver 69.

Fuel may be delivered to fuel injectors 66 and 67 by a high pressure fuel system 190 including a fuel tank, fuel pumps, and fuel rails. Further, the fuel tank and rails may each have a pressure transducer providing a signal to controller 12. In this example, both direct fuel injector 67 and port fuel injector 66 are shown. However, certain engines may include only one kind of fuel injector such as either direct fuel injector or port fuel injector. Fuel injection to each cylinder may be carried out via direct injectors (in absence of port injectors) or port direct injectors (in absence of direct injectors).

Exhaust gases flow through exhaust manifold 48 into emission control device 70 which can include multiple catalyst bricks, in one example. In another example, multiple emission control devices, each with multiple bricks, can be used. Emission control device 70 can be a three-way type catalyst in one example.

Exhaust gas sensor 76 is shown coupled to exhaust manifold 48 upstream of emission control device 70 (where sensor 76 can correspond to a variety of different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. A single exhaust gas sensor may serve 1, 2, 3, 4, 5, or other number of cylinders.

Distributorless ignition system 88 provides ignition spark to combustion chamber 30 via spark plug 91 in response to spark advance signal SA from controller 12.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 43 via an EGR valve (not shown). Alternatively, a portion of combustion gases may be retained in the combustion chambers by controlling exhaust valve timing.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 53. Electric machine 53 may be a motor or a motor/generator. Crankshaft 40 of engine 10 and electric machine 53 are connected via a transmission 57 to vehicle wheels 55 when one or more clutches 56 are engaged. In the depicted example, a first clutch 56 is provided between crankshaft 40 and electric machine 53, and a second clutch 56 is provided between electric machine 53 and transmission 57. Controller 12 may send a signal to an actuator of each clutch 56 to engage or disengage the clutch, so as to connect or disconnect crankshaft 40 from electric machine 53 and the components connected thereto, and/or connect or disconnect electric machine 53 from transmission 57 and the components connected thereto. Transmission 57 may be a gearbox, a planetary gear system, or another type of transmission. The powertrain may be configured in various manners including as a parallel, a series, or a series-parallel hybrid vehicle.

Electric machine 53 receives electrical power from a traction battery 58 to provide torque to vehicle wheels 55.

Electric machine 53 may also be operated as a generator to provide electrical power to charge battery 58, for example during a wheel caliper operation.

Controller 12 is shown in FIG. 1 as a conventional microcomputer including: central processing unit (CPU) 102, input/output (I/O) ports 104, read-only memory (ROM) 106, random access memory (RAM) 108, keep alive memory (KAM) 110, and a conventional data bus. Controller 12 is shown receiving various signals from sensors coupled to engine 10, in addition to those signals previously discussed, including measurement of inducted mass air flow (MAF) from mass air flow sensor 118; engine coolant temperature (ECT) from temperature sensor 112 coupled to cooling sleeve 114; a profile ignition pickup signal (PIP) from Hall effect sensor 38 coupled to crankshaft 40; and throttle position TP from throttle position sensor 59 and an absolute Manifold Pressure Signal MAP from sensor 122. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In one example, sensor 38, which is also used as an engine speed sensor, produces a predetermined number of equally spaced pulses every revolution of the crankshaft. The controller 12 receives signals from the various sensors of FIG. 1 and employs the various actuators of FIG. 1, such as throttle 64, fuel injectors 66 and 67, spark plug 91, etc., to adjust engine operation based on the received signals and instructions stored on a memory of the controller. As one example, the controller may send a pulse width signal to the port injector and/or the direct injector to adjust a timing of fuel injection and an amount of fuel delivered to a cylinder via an injector. The controller 12 may be coupled to a pedal position sensor 134. A vehicle operator 130 may depress or incline a pedal 132 based on a desired driver demand.

FIG. 2 shows a schematic illustration of an embodiment 200 including an engine system 208. The engine system 208 may include the engine 10. As such, components previously introduced are similarly numbered in this figure.

The engine 10 includes a plurality of cylinders 230. The engine 10 includes the engine intake 42 and the engine exhaust 48. The engine intake 42 includes the throttle 64 in fluidic communication with engine intake manifold 44. An airbox 62 may be arranged upstream of the throttle 64 relative to a direction of airflow. The engine exhaust system 225 includes the exhaust manifold 48 leading to an exhaust passage 235 that routes exhaust gas to the atmosphere. The engine exhaust system 225 may include one or more emission control devices including catalyst 270. Catalyst 270 may be a non-limiting example of one of the one or more emission control devices 70 of FIG. 1. The catalyst 270 may be a three-way catalyst, a NOx trap, a particulate filter, or other aftertreatment device.

An exhaust gas heat recovery (EGHR) device 252 may be positioned upstream of the catalyst 270 relative to a direction of exhaust gas flow. The EGHR device 252 may include a plurality of tubes through which fluid (e.g., coolant) flows. In one example, a coolant system 280 is fluidly coupled to each of the engine 10 and the EGHR device 252. Exhaust gases may pass over the plurality of tubes and heat fluid flowing therethrough, thereby capturing heat from the exhaust gas. In this way, the temperature of exhaust gas exiting the EGHR device 252 is lower than the temperature exhaust gas entering the EGHR device 252.

A bypass valve 254 may be positioned upstream of the EGHR device 252. The bypass valve 254 may be positioned at an intersection between the exhaust passage 235 and an upstream end of an EGHR bypass passage 256. The bypass valve 254 may be configured to control exhaust gas flow into the EGHR device 252 and the EGHR bypass passage 256. The bypass valve 254 may include an actuator configured to receive signals from the controller 12 of FIG. 1 to adjust a position of the bypass valve 254. The bypass valve 254 may be a two-position valve including a closed position and an open position. The closed position may seal the EGHR bypass passage 256 and force exhaust gas to flow through the EGHR device 252. The open position may seal the exhaust passage 235 upstream of the EGHR device 252, as such, exhaust gases flow through the EGHR bypass passage 256 directly to the catalyst 270. In some examples, the bypass valve 254 may be a multi-position valve with the open position, the closed position, and positions therebetween that allow exhaust gases to bypass the EGHR device and flow directly therethrough, which may provide a blended temperature of exhaust gas flowing to the catalyst 270. Control routines for actuating the bypass valve 254 based on a sensed temperature of the catalyst and/or a cabin heating request. In other examples, the bypass valve 254 may be a two-position valve (e.g., flap valve) to reduce resources expended relative to a multi-position valve.

Turning now to FIG. 3, it shows an embodiment 300 that includes an air delivery system 310 coupled to the embodiment 200 of FIG. 2. The air delivery system 310 may include an air delivery passage 312 with an inlet coupled to the airbox 62 and an outlet that intersects with the exhaust passage 235 upstream of the bypass valve 254. A pump 314 may be arranged in the air delivery passage 312. The pump 314 may pressurize and conduct air through the air delivery passage 312. An air flow valve 316 may be arranged proximally to the outlet of the air delivery passage 312. An actuator of the air flow valve 316 may be in communication with the controller 12 of FIG. 1 and configured to adjust a position of the air flow valve 316. The air flow valve 316 may include two positions, including a closed position and an open position. The closed position may seal the air delivery passage 312, thereby blocking air from flowing through the air delivery passage 312 to the exhaust passage 235. The open position may open the air delivery passage 312, thereby promoting air to flow through the air delivery passage 312 to the exhaust passage 235.

In some examples, additionally or alternatively, the engine 10 may be boosted, wherein a compressor may be arranged in the intake passage 42. The compressor may be configured as a supercharger and driven via power from an energy storage device. Alternatively, the compressor may be driven via a turbine arranged in the exhaust passage 235. In such an example, the air delivery passage 312 may intersect the intake passage 42 at a junction downstream of the compressor. By doing this, the pump 314 may be omitted.

Turning now to FIG. 4, it shows a method 400 for adjusting a position of the bypass valve. Instructions for carrying out method 400 and the rest of the methods included herein may be executed by a controller based on instructions stored on a memory of the controller and in conjunction with signals received from sensors of the vehicle system, such as the sensors described above with reference to FIG. 1. The controller may employ engine actuators of the vehicle system to adjust engine operation, according to the methods described below.

The method 400 begins at 402, which includes determining operating conditions. Operating conditions may include an engine temperature, an engine speed, a throttle position, a vehicle speed, and an air/fuel ratio.

At 404, the method 400 may include determining if a cold-start is occurring. A cold-start may be occurring if a catalyst temperature is less than a lower threshold catalyst temperature. The lower threshold catalyst temperature may be based on a non-zero, positive number. In one example, the lower threshold catalyst temperature is based on a temperature at which the catalyst is catalytically active and configured to treat exhaust emissions.

If a cold-start is occurring, then at 406, the method 400 may include opening the bypass valve.

At 408, the method 400 may include flowing exhaust gas around the EGHR device. In one example, exhaust gas flows from the exhaust passage, into the bypass passage at a location upstream of the EGHR device, and reenters the exhaust passage at a location downstream of the EGHR device and upstream of the catalyst. By doing this, a temperature of the exhaust gas may not be reduced prior to flowing to the catalyst, which may reduce cold-start times.

Returning to 404, if the cold-start is not occurring, then at 410, the method 400 may include determining the catalyst is lit-off. As such, the catalyst temperature is greater than at least the lower threshold catalyst temperature and warming the catalyst may not be requested.

At 412, the method 400 may include determining if an exhaust gas temperature is less than a threshold exhaust gas temperature. The threshold exhaust gas temperature may be based on a non-zero, positive number. In one example, the threshold exhaust gas temperature is based on an upper threshold catalyst temperature at which the catalyst may begin to degrade (e.g., burn).

If the exhaust gas temperature is not less than the threshold exhaust gas temperature, then the method 400 may proceed to 406 as described above.

If the exhaust gas temperature is less than the threshold exhaust gas temperature, then the exhaust gas may not degrade the catalyst and cooling via the EGHR device may not be requested.

At 414, the method 400 may include determining if a cabin heating request is less than a threshold request. If the cabin heating request is greater than or equal to the threshold request, then it may be desired to capture heat from the exhaust gas via the EGHR device to increase a cabin temperature. As such, the method 400 may proceed to 406 following a yes at 414.

If the cabin heating request is less than the threshold request, then at 416, the method 400 may include closing the bypass valve. When in the closed position, the bypass valve may seal the bypass passage.

At 418, the method 400 may include flowing exhaust gases through the EGHR device. In one example, all exhaust gases flow through the EGHR device prior to flowing to the catalyst. In this way, an exhaust gas temperature may be reduced relative to temperatures when the bypass valve is open.

Turning now to FIG. 5, it shows a method 500 for operating the bypass valve and the air flow valve based on at least the catalyst temperature.

At 502, the method 500 may include determining operating conditions. Operating conditions may include an engine temperature, an engine speed, a throttle position, a vehicle speed, and an air/fuel ratio.

At 504, the method 500 may include determining a catalyst temperature. The catalyst temperature may be determined directly via a temperature sensor or tracked based on exhaust gas flow and exhaust gas temperatures.

At 506, the method 500 may include determining if the catalyst temperature is less than the lower threshold catalyst temperature. If the catalyst temperature is not lower than the lower threshold catalyst temperature, then a cold-start is not occurring and at 508, the method 500 may include determining if the catalyst temperature is greater than or equal to the upper threshold catalyst temperature. If the catalyst temperature is not greater than or equal to the upper threshold catalyst temperature, then the catalyst temperature may be between the lower and upper threshold catalyst temperatures.

At 510, the method 500 may include closing the air flow valve. As such, the air delivery passage may be sealed and air may not be delivered to the exhaust passage to increase an exhaust gas temperature.

At 512, the method 500 may include monitoring the catalyst temperature. The positions of the air flow valve and the bypass valve may be adjusted in response to the catalyst temperature. When the catalyst temperature is between the lower and upper threshold catalyst temperatures, the bypass valve is open and the air flow valve is closed. The exhaust gas temperature may be unchanged via the EGHR device and air flow system.

Returning to 506, if the catalyst temperature is less than the lower threshold catalyst temperature, then at 514, the method 500 may include opening the air flow valve. As such, air may flow to the exhaust passage via the air flow passage.

At 516, the method 500 may include opening the bypass valve. As such, the bypass passage is open and the exhaust passage is sealed a the EGHR device inlet.

At 518, the method 500 may include adjusting engine operating parameters. Engine operating parameters may be adjusted to increase exhaust gas temperatures to reduce a duration of the cold-start. For example, the engine operating parameters may be adjusted to operate more rich which may increase combustion upon contacting the air flow provided to the exhaust passage.

At 520, the method 500 may include heating the catalyst. The catalyst may be heated until the cold-start is complete and the catalyst temperature is greater than the lower threshold catalyst temperature.

Returning to 508, if the catalyst temperature is greater than or equal to the upper threshold catalyst temperature, then at 522, the method 500 may include closing the air flow valve. As such, air may not flow through the air flow passage.

At 524, the method 500 may include closing the bypass valve. As such, the bypass valve may be sealed and exhaust gases may not flow therethrough.

At 526, the method 500 may include adjusting engine operating parameters. In one example, adjusting engine operating parameters may include adjustments to decrease the exhaust gas temperature. For example, the air/fuel ratio may increase and/or combustion timing may be advanced to decrease the exhaust gas temperature.

At 528, the method 500 may include cooling the catalyst. Exhaust gases may flow through the EGHR device prior to reaching the catalyst.

In some examples, the bypass valve and the air flow valve may be multi-position valves configured to provide tunable partially open/closed positions. In such an example, the bypass valve and the air flow valve may be partially opened, partially closed, fully opened, and/or fully closed to achieve a desired target exhaust gas temperature. By doing this, operation of the engine, the catalyst, and cabin heating may be enhanced.

Turning now to FIG. 6, it shows a graph 600 illustrating an operating sequence based on catalyst temperatures, exhaust gas temperatures, and a cabin heating request. Plot 610 illustrates the exhaust gas temperature and dashed line 612 illustrates a threshold exhaust gas temperature. Plot 620 illustrates the catalyst temperature, dashed line 622 illustrates the lower threshold catalyst temperature, and dashed line 624 illustrates the upper threshold catalyst temperature. Plot 630 illustrates a bypass valve position. Plot 640 illustrates an air valve position. Plot 650 illustrates a cabin heating request and dashed line 652 illustrates a threshold cabin heating request. Time increases from a left to a right side of the figure.

Prior to t1, the exhaust gas temperature is less than the threshold exhaust gas temperature. The catalyst temperature is less than the lower threshold catalyst temperature thereby indicating a cold-start is occurring. As such, the bypass valve is opened to flow exhaust gas around the EGHR device. The air flow valve is opened to flow air from an engine intake to the engine exhaust, which may increase the exhaust gas temperature. A cabin heat request is greater than the threshold cabin heating request. However, in the example of FIG. 6, since the catalyst is not lit-off, exhaust gases bypass the EGHR despite the cabin heating request being greater than the threshold cabin heating request.

At t1, the catalyst is lit-off. The cabin heating request is still greater than the threshold cabin heating request. As such, the bypass valve is moved to the closed position to force exhaust gases to flow through the EGHR, which may extract heat from the exhaust gas and use the extracted heat to increase the cabin temperature. The air valve may remain open to further increase the exhaust gas temperature, which may increase customer satisfaction. Between t1 and t2, the cabin heating request is met.

At t2, the exhaust gas temperature exceeds the threshold exhaust gas temperature. The threshold exhaust gas temperature may correspond to an exhaust gas temperature at which degradation to the catalyst may occur. The exhaust gas temperature may exceed the threshold exhaust gas temperature when an engine load is greater than a threshold load. During previous examples, engine operation may be limited to prevent such exhaust gas temperatures. However, inclusion of the EGHR device may allow higher engine operating temperatures, which may reduce emissions and a demand for more thermally resistant materials. As such, the air valve is actuated to a closed position. The bypass valve is maintained in the closed position to cool the exhaust gas via the EGHR device. The cabin heating request is less than the threshold cabin heating request.

Between t2 and t3, the exhaust gas temperature is reduced via the EGHR device. The catalyst temperature increases while remaining within the range between the lower and upper threshold catalyst temperatures. As such, degradation to the catalyst is reduced. At t3, the exhaust gas temperature decreases below the threshold exhaust gas temperature. The catalyst temperature remains between the lower and upper threshold catalyst temperatures. As such, the bypass valve is opened and exhaust gases are bypassed around the EGHR device.

After t3, the bypass valve remains open and the air valve remains closed to maintain the catalyst temperature between the lower and upper threshold catalyst temperatures.

In this way, the catalyst temperature is controlled via opening and closed of the bypass valve and air valve. The catalyst temperature may be increased via opening the bypass valve and/or opening the air valve. The catalyst temperature may be decreased via closing the bypass valve and/or closing the air valve. It will be appreciated that more precise temperature control may be provided via partially opening or closing the bypass valve and/or the air valve.

The disclosure also provides support for a system, comprising: an exhaust gas heat recovery (EGHR) device with a bypass arranged upstream of a catalyst. In a first example of the system, the EGHR device is arranged between an engine and the catalyst. In a second example of the system, optionally including the first example, the bypass is positioned to flow exhaust gases around the EGHR device based on a position of a bypass valve. In a third example of the system, optionally including one or both of the first and second examples, the system further comprises: a controller comprising instructions stored on non-transitory memory thereof that when executed enable the controller to open a bypass valve in response to one or more of a cold-start, an exhaust gas temperature being greater than a threshold exhaust gas temperature, and a cabin heating request being greater than or equal to a threshold cabin heating request. In a fourth example of the system, optionally including one or more or each of the first through third examples, the instructions further cause the controller to close the bypass valve in response to one or more of the catalyst being lit-off, the exhaust gas temperature being less than the threshold exhaust gas temperature, and the cabin heating request being less than the threshold cabin heating request. In a fifth example of the system, optionally including one or more or each of the first through fourth examples, the bypass comprises an inlet coupled to a portion of an exhaust passage upstream of the EGHR device and an outlet coupled to a portion of the exhaust passage downstream of the EGHR device and upstream of the catalyst.

The disclosure also provides support for a system, comprising: an engine coupled to an exhaust passage, an exhaust gas heat recovery (EGHR) device downstream of the engine relative to a direction of exhaust gas flow, a catalyst arranged downstream of the EGHR device, a bypass passage comprising an inlet between the engine and the EGHR device and an outlet between the EGHR device and the catalyst, a bypass valve, and a controller comprising instructions stored on non-transitory memory thereof that when executed enable the controller to: adjust a position of the bypass valve based on one or more of a catalyst temperature, an exhaust gas temperature, and a cabin heating request. In a first example of the system, the bypass valve is a two position valve comprising a fully closed position and a fully open position. In a second example of the system, optionally including the first example, the bypass valve is a multi-position valve comprising a fully closed position, a fully open position, and positions between the fully closed and fully open positions. In a third example of the system, optionally including one or both of the first and second examples, the position of the bypass valve is adjusted to a closed position in response to one or more of the catalyst temperature being greater than a lower threshold catalyst temperature, the exhaust gas temperature being less than a threshold exhaust gas temperature, and the cabin heating request being less than a threshold cabin heating request. In a fourth example of the system, optionally including one or more or each of the first through third examples, the position of the bypass valve is adjusted to an open position in response to one or more of the catalyst temperature being less than or equal to the lower threshold catalyst temperature, the exhaust gas temperature being greater than or equal to the threshold exhaust gas temperature, and the cabin heating request being greater than or equal to the threshold cabin heating request. In a fifth example of the system, optionally including one or more or each of the first through fourth examples, the instructions further cause the controller to operate the engine above a threshold temperature. In a sixth example of the system, optionally including one or more or each of the first through fifth examples, the position of the bypass valve is adjusted based on an engine load. In a seventh example of the system, optionally including one or more or each of the first through sixth examples, the bypass valve is positioned adjacent to an inlet of the bypass passage. In an eighth example of the system, optionally including one or more or each of the first through seventh examples, a coolant system is coupled to the engine and the EGHR device.

The disclosure also provides support for a method, comprising: bypassing exhaust gas around an exhaust gas heat recovery (EGHR) device in response to a cold-start of a catalyst downstream of the EGHR device, and flowing exhaust gas to the EGHR device prior to the catalyst in response to a cabin heating request. In a first example of the method, bypassing is further in response to an exhaust gas temperature being greater than a threshold temperature. In a second example of the method, optionally including the first example, flowing exhaust gas to the EGHR device is further in response to a catalyst temperature. In a third example of the method, optionally including one or both of the first and second examples, flowing exhaust gas to the EGHR device is further in response to an engine load. In a fourth example of the method, optionally including one or more or each of the first through third examples, the method further comprises: adjusting a position of a bypass valve to adjust exhaust gas flow in and out of a bypass passage with an inlet coupled to a portion of an exhaust passage between the EGHR device and an engine and an outlet coupled to a portion of the exhaust passage between the EGHR device and the catalyst.

The disclosure also provides support for a system, comprising: an exhaust gas heat recovery (EGHR) device with a bypass arranged upstream of a catalyst, and an air delivery system configured to flow air upstream of the EGHR device. In a first example of the system, an outlet of the air delivery system is arranged between an engine and the EGHR device. In a second example of the system, optionally including the first example, the air delivery system comprises a valve and a pump. In a third example of the system, optionally including one or both of the first and second examples, the system further comprises: a controller comprising instructions stored on non-transitory memory thereof that when executed enable the controller to adjust one or more of a position of a bypass valve of the EGHR device and a position of an air flow valve of the air delivery system in response to one or more of a catalyst temperature, an engine load, and a cabin heating request. In a fourth example of the system, optionally including one or more or each of the first through third examples, the instructions further cause the controller to open the bypass valve and open the air flow valve in response to the catalyst temperature being less than a lower threshold catalyst temperature. In a fifth example of the system, optionally including one or more or each of the first through fourth examples, the instructions further cause the controller to close the bypass valve and open the air flow valve in response to a cabin heating request being greater than a threshold cabin heating request. In a sixth example of the system, optionally including one or more or each of the first through fifth examples, the instructions further cause the controller to close the bypass valve and close the air flow valve in response to the engine load being greater than a threshold load.

The disclosure also provides support for a system, comprising: an engine coupled to an intake passage and an exhaust passage, an exhaust gas heat recovery (EGHR) device arranged in the exhaust passage, a catalyst arranged downstream of the EGHR device relative to a direction of exhaust gas flow, a bypass passage comprising an inlet between the engine and the EGHR device and an outlet between the EGHR device and the catalyst, a bypass valve, an air delivery system comprising an air flow valve adjacent to an outlet coupled to the exhaust passage, and a controller comprising instructions stored on non-transitory memory thereof that when executed enable the controller to: adjust a position of one or more of the bypass valve and the air flow valve based on one or more of a catalyst temperature, an exhaust gas temperature, and a cabin heating request. In a first example of the system, an inlet of the air delivery system is coupled to the intake passage. In a second example of the system, optionally including the first example, the outlet of the air delivery system is coupled to the exhaust passage at a location upstream of the bypass valve relative to the direction of exhaust gas flow. In a third example of the system, optionally including one or both of the first and second examples, a pump is arranged in the air delivery system between the intake passage and the air flow valve. In a fourth example of the system, optionally including one or more or each of the first through third examples, the instructions further cause the controller to adjust the bypass valve to a closed position and the air flow valve to an open position in response to the catalyst temperature being less than a lower threshold catalyst temperature. In a fifth example of the system, optionally including one or more or each of the first through fourth examples, the instructions further cause the controller to adjust the bypass valve to an open position and the air flow valve to an open position in response to the cabin heating request being greater than a threshold cabin heating request. In a sixth example of the system, optionally including one or more or each of the first through fifth examples, the instructions further cause the controller to adjust the bypass valve to an open position and the air flow valve to a closed position in response to the engine load being greater than a threshold engine load. In a seventh example of the system, optionally including one or more or each of the first through sixth examples, the bypass valve and the air flow valve are multi-position valves.

The disclosure also provides support for a method, comprising: adjusting an air flow to an exhaust passage comprising an exhaust gas heat recovery (EGHR) device upstream of a catalyst relative to a direction of exhaust gas flow. In a first example of the method, adjusting the air flow adjusts an exhaust gas temperature, wherein the exhaust gas temperature is further adjusted by flowing exhaust gas to or bypassing exhaust gas around the EGHR device via a bypass valve and a bypass passage. In a second example of the method, optionally including the first example, adjusting the air flow comprises adjusting a position of an air flow valve of an air delivery system. In a third example of the method, optionally including one or both of the first and second examples, the air delivery system is configured to flow air from upstream of an engine to downstream of an engine relative to a direction of gas flow. In a fourth example of the method, optionally including one or more or each of the first through third examples, the air flow is delivered to a location upstream of the EGHR device.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine;
a catalyst;
an exhaust gas heat recovery (EGHR) device with a bypass arranged upstream of the catalyst, wherein the EGHR device is arranged directly between the engine and the catalyst;
an air delivery passage with an air flow valve, wherein the air deliver passage delivers intake air from an engine intake to an exhaust passage upstream of the bypass; and
a controller comprising instructions stored on non-transitory memory thereof that when executed enable the controller to:
responsive to a catalyst temperature being less than a threshold catalyst temperature and an exhaust gas temperature being less than a threshold exhaust gas temperature, flow exhaust gas and intake air through the bypass;
responsive to the catalyst temperature being greater than or equal to the threshold catalyst temperature and the exhaust gas temperature being less than the threshold exhaust gas temperature, flow exhaust gas and intake air to the EGHR;
responsive to the catalyst temperature being greater than the threshold catalyst temperature and the exhaust gas temperature being greater than the threshold exhaust gas temperature, close the air flow valve and flow exhaust gas to the EGHR.

2. The system of claim 1, wherein the threshold catalyst temperature corresponds to a lit-off temperature of the catalyst, and the threshold exhaust gas temperature corresponds to an exhaust gas temperature at which degradation to the catalyst occurs.

3. The system of claim 1, wherein the bypass is positioned to flow exhaust gases around the EGHR device based on a position of a bypass valve.

4. The system of claim 1, further comprising a controller comprising instructions stored on non-transitory memory thereof that when executed enable the controller to open a bypass valve in response to one or more of a cold-start, an exhaust gas temperature being greater than a threshold exhaust gas temperature, and a cabin heating request being greater than or equal to a threshold cabin heating request.

5. The system of claim 4, wherein the instructions further cause the controller to close the bypass valve in response to one or more of the catalyst being lit-off, the exhaust gas temperature being less than the threshold exhaust gas temperature, and the cabin heating request being less than the threshold cabin heating request.

6. The system of claim 1, wherein the bypass comprises an inlet coupled to a portion of an exhaust passage upstream of the EGHR device and an outlet coupled to a portion of the exhaust passage downstream of the EGHR device and upstream of the catalyst, and wherein the air delivery passage comprises an inlet coupled to an airbox arranged in the engine intake and an outlet that intersects with an exhaust passage upstream of a bypass valve of the bypass.

7. A system, comprising:
an engine coupled to an exhaust passage;
an exhaust gas heat recovery (EGHR) device directly downstream of the engine relative to a direction of exhaust gas flow;
a catalyst arranged downstream of the EGHR device;
a bypass passage comprising an inlet between the engine and the EGHR device and an outlet between the EGHR device and the catalyst;
a bypass valve;
an air delivery passage with an inlet coupled to an airbox arranged in an engine intake and an outlet that intersects with an exhaust passage upstream of a bypass valve of the bypass, wherein an air flow valve is arranged in the air delivery passage; and
a controller comprising instructions stored on non-transitory memory thereof that when executed enable the controller to:

adjust a position of the bypass valve and the air flow valve based on a catalyst temperature and an exhaust gas temperature.

8. The system of claim 7, wherein the bypass valve is a two position valve comprising a fully closed position and a fully open position.

9. The system of claim 7, wherein the bypass valve is a multi-position valve comprising a fully closed position, a fully open position, and positions between the fully closed and fully open positions.

10. The system of claim 7, wherein the positions of the bypass valve and the air flow valve are adjusted to an open position in response to the catalyst temperature being less than or equal to a threshold catalyst temperature, and the exhaust gas temperature being less than a threshold exhaust gas temperature.

11. The system of claim 10, wherein the positions of the bypass valve and the air flow valve are adjusted to a closed position in response to the catalyst temperature being greater than the threshold catalyst temperature, and the exhaust gas temperature being greater than the threshold exhaust gas temperature.

12. The system of claim 7, wherein the instructions further cause the controller to operate the engine above a threshold temperature.

13. The system of claim 7, wherein the positions of the bypass valve and the air flow valve are adjusted based on an engine load.

14. The system of claim 7, wherein the bypass valve is positioned adjacent to the inlet of the bypass passage, and wherein the positions of the bypass valve and the air flow valve are adjusted based on one or more of an exhaust gas temperature and a cabin heating request.

15. The system of claim 7, wherein a coolant system is coupled to the engine and the EGHR device.

* * * * *